United States Patent [19]

Guerra et al.

[11] Patent Number: 5,052,610

[45] Date of Patent: Oct. 1, 1991

[54] HEAT-RECOVERABLE SOLDERING DEVICE

[75] Inventors: Robert Guerra, Fremont; Michael Nordling, Santa Clara; Pravin Soni, Union City, all of Calif.

[73] Assignee: Raychem Corporation, Menlo Park, Calif.

[21] Appl. No.: 565,874

[22] Filed: Aug. 9, 1990

Related U.S. Application Data

[63] Continuation of Ser. No. 443,094, Nov. 27, 1989, abandoned, which is a continuation of Ser. No. 288,335, Dec. 21, 1988, abandoned.

[51] Int. Cl.[5] .......................... H01R 4/72; B29C 61/06

[52] U.S. Cl. .................................. 228/56.3; 228/215; 174/DIG. 8; 403/273

[58] Field of Search ..................... 228/56.3, 179, 215; 174/DIG. 8; 403/273

[56] References Cited

U.S. PATENT DOCUMENTS

| | | | |
|---|---|---|---|
| 3,243,211 | 3/1966 | Wetmore . | |
| 3,525,799 | 8/1970 | Ellis . | |
| 3,864,228 | 2/1975 | Rossetti . | |
| 4,094,949 | 6/1978 | Yokokawa et al. . | |
| 4,197,380 | 4/1980 | Chao et al. . | |
| 4,282,396 | 8/1981 | Watine et al. . | |
| 4,283,596 | 8/1981 | Vidakovits et al. . | |
| 4,387,168 | 6/1983 | Morita . | |
| 4,400,487 | 8/1983 | Stoneberg et al. . | |
| 4,499,136 | 2/1985 | Nakamura et al. | 174/DIG. 8 |
| 4,504,699 | 3/1985 | Dones et al. . | |
| 4,507,340 | 3/1985 | Rinde et al. | 174/DIG. 8 |
| 4,530,570 | 7/1985 | Morozumi et al. . | |
| 4,575,537 | 3/1986 | Ueno . | |
| 4,612,351 | 9/1986 | Caporiccio et al. . | |
| 4,642,326 | 2/1987 | Yasamura et al. . | |
| 4,647,716 | 3/1987 | Akiyama et al. | 403/273 |
| 4,696,841 | 9/1987 | Vidakovits . | |
| 4,713,418 | 12/1987 | Logothetis et al. . | |
| 4,722,471 | 2/1988 | Gray et al. . | |
| 4,732,412 | 3/1988 | van der Linden et al. . | |
| 4,832,248 | 5/1989 | Soni et al. . | |

FOREIGN PATENT DOCUMENTS

| | | |
|---|---|---|
| 79702 | 5/1983 | European Pat. Off. . |
| 0141675 | 5/1985 | European Pat. Off. . |
| 0270283 | 6/1988 | European Pat. Off. . |
| 2907941A | 9/1979 | Fed. Rep. of Germany . |
| 3138300A | 6/1982 | Fed. Rep. of Germany . |
| 2425744 | 12/1979 | France . |
| 1470049 | 4/1977 | United Kingdom . |
| 2025157 | 1/1980 | United Kingdom . |
| WO87/06597 | 11/1987 | World Int. Prop. O. . |

OTHER PUBLICATIONS

International Search Report for PCT/US89/05763.
International Search Report for PCT/US89/05761.
International Search Report for PCT/US89/05762.

*Primary Examiner*—Samuel M. Heinrich
*Attorney, Agent, or Firm*—Marguerite E. Gerstner; Edith A. Rice; Herbert G. Burkard

[57] ABSTRACT

Heat recoverable soldering devices comprising a heat recoverable tubular article having at least one open end, and containing a solder insert, is provided with a curable adhesive insert between the solder insert and the open end. The curable adhesive melts, flows and cures when heat is applied to recover the article. The adhesive cures such that its viscosity increases to a value of at least 1.5 its initial viscosity during recovery of the article. Curing of the adhesive inhibits flow of the adhesive through the open end of the article and/or into the solder connection formed between two (or more) elongate bodies inserted into the article.

2 Claims, 1 Drawing Sheet

HEAT-RECOVERABLE SOLDERING DEVICE

This application is a continuation of application Ser. No. 07/443,094 filed Nov. 27, 1989, now abandoned, and which is a continuation of application Ser. No. 288,335, filed Dec. 21, 1988, now abandoned.

BACKGROUND OF THE INVENTION

This invention relates to devices for forming solder connections for example electrical connections between electrical conductors or mechanical connections between pipes and other equipment. In particular the invention relates to such devices that are dimensionally heat-recoverable.

Heat-recoverable articles are articles the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case maybe, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example in British Patent 1,440,524, an elastomeric member such as an outer tubular member is held in a stretched state by a second member, such as an inner tubular member, which, upon heating weakens and thus allows the elastomeric member to recover.

Heat-recoverable articles have become widely used for forming solder connections between electrical conductors in view of the ease of forming the connection and the quality of the connection so formed. For such applications the article, usually in the form of a sleeve, contains a quantity of solder for forming the electrical connection and a pair of fusible inserts for sealing the connection. These articles are described for example in U.S. Pat. Nos. 3,243,211, 4,282,396, 4,283,596, and 4,722,471, European Patent Publication No. 0,270,283, and British Patent No. 1,470,049 the disclosures of which are incorporated herein by reference, and are sold by Raychem Corporation, Menlo Park, Calif. under the trade mark "SOLDER SLEEVE" amongst others. Similar articles are also disclosed in U.S. Pat. Nos. 4,504,699 and 4,282,396, which disclosures are also incorporated herein by reference.

U.S. Pat. No. 4,722,471 discloses a solder connection device between a plurality of elongate bodies, which comprises a hollow, dimensionally heat-recoverable article having an aperture therein, the article containing a first solder insert for forming a solder connection between the bodies and containing a second solder insert, each insert being arranged to flow directly onto the bodies when the device is heated, the second insert being located adjacent to the first insert and responding to heat applied to the article more slowly than the first insert, so that, when the device is heated to form the connection, the second insert acts as a barrier to control the extent of flow of the fused first solder insert along at least one of the bodies.

European Patent Publication 0,270,283 discloses a device for forming a solder connection between a plurality of elongate bodies which comprises a hollow, dimensionally heat-recoverable article having an aperture therein, the article containing a solder insert for forming a solder connection between the bodies, and first and second heat-activatable inserts for environmentally sealing said aperture, said second adhesive insert having a higher viscosity than said first insert at the recovery temperature of the article, and being positioned with respect to the first insert to restrict the flow of the first insert under the recovery force of the article.

Although such devices are satisfactory for many applications, in certain unfavorable instances the quality of the environmental seal formed may depend on the skill of the installer, and, in particular, the devices may be sensitive to underheating or overheating or both. This may result in unreliable long term performance especially in corrosive environments or under severe mechanical stress, or damage to the sleeve of the device or the insulation surrounding the conductors to be connected.

SUMMARY OF THE INVENTION

The present invention provides a heat recoverable soldering device which comprises:

(a) a hollow, heat-recoverable, tubular article having an open end and containing a solder insert for forming a solder connection between a plurality of bodies inserted therein; and (b) a curable adhesive insert positioned between said solder insert and said opening end;

wherein during heat recovery of said article, said solder melts and forms said connection and said adhesive melts and flows to fill any voids between said elongate bodies and the recovered article and cures such that flow thereof into the solder connection or through the open end of the article is inhibited; said cured adhesive environmentally sealing said open end when the article has recovered.

DETAILED DESCRIPTION OF THE INVENTION

Figure 2:
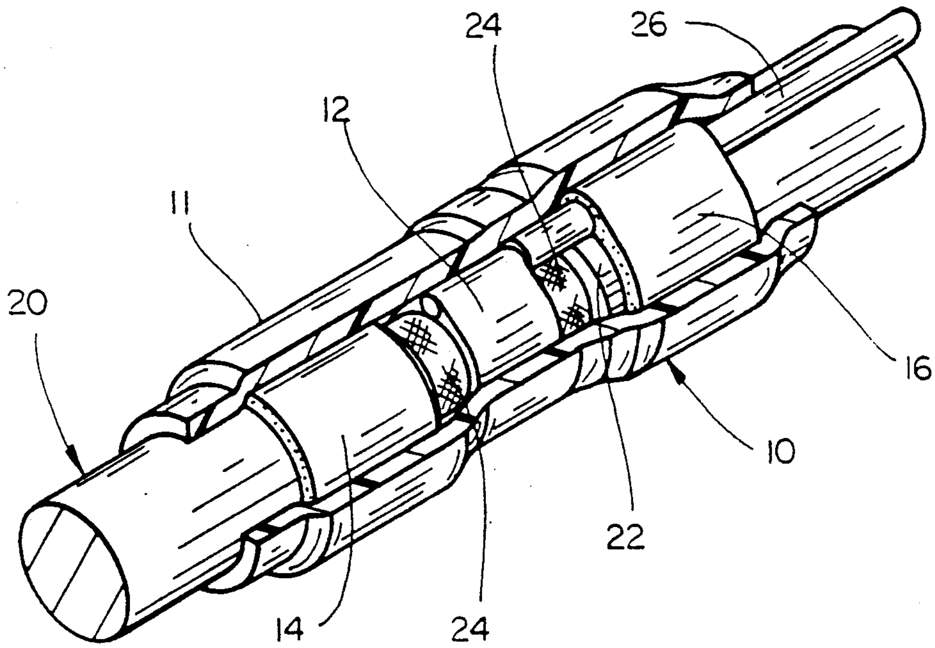
FIG. 2 illustrates the device of FIG. 1 installed to form a sealed cable shield termination.

Preferably at least one of the bodies is elongate, and usually the device is used to connect two elongate bodies, for example wires or pipes. A particularly preferred used is the connection of a ground lead to an outer conductor of a cable, as shown in FIG. 2 (discussed below). The ground lead, which comprises one of the bodies, may be pre-affixed to the device.

The term "solder" as used herein includes both conventional metallic solder and solder adhesives in which a hot-melt adhesive, e.g. a polyamide hot-melt adhesive, or a thermosetting adhesive such as an epoxy adhesive, is filled with metal particles, e.g. with silver flake. In most cases, however, the solder insert will be formed from conventional metallic solder. If desired, two or more solder inserts, having the same or different properties, may be provided.

The solder may comprise any suitable composition, for example a 63% Sn/37% Pb eutectic, a 96%/4% Ag eutectic, or a non-eutectic composition, e.g. 50% Sn/50% Pb.

The device may be formed in the form of a simple open-ended sleeve, each end of which is intended to receive one of the bodies to be connected. In this embodiment, the sleeve is provided with two inserts of a curable adhesive, one between one open end and the solder and the other between the second open end and the solder. The dimensions of the sleeve may be substantially uniform, or one end may be larger than the other in order to accommodate a relatively large body. The device may be of any suitable size and is preferably from 0.5-5 cm in length and 0.2-3 cm in diameter. This may for example be the case where two pipes are intended to be joined, one pipe being larger than the other in order to receive the other therein. Alternatively the heat-recoverable article may be in the form of a cap, for example for forming a stub joint between a number of electrical conductors all of which are inserted into one open-end of the device. In another form of device which provides a composite connector, the article may have a metal connection element, e.g. a short piece of braid in the case of a coaxial cable connector. The solder insert is preferably positioned in the article substantially mid-way between its open ends, and the first and second adhesive inserts are preferably positioned adjacent each of the open ends. Yet another form of device may be a multiple connector in which an array of hollow articles has been formed by bonding together a pair of superimposed webs of polymeric material at spaced apart intervals and then cross-linked, for example as described in U.S. Pat. No. 4,345,957, the disclosure of which is incorporated herein by reference.

The solder insert may have any of a number of configurations and may be located concentrically or eccentrically within the article. Preferably, however, the insert is arranged to extend around at least one of the bodies to be inserted, and is preferably therefore in the form of a ring arranged substantially coaxially within the article.

Figure 1:
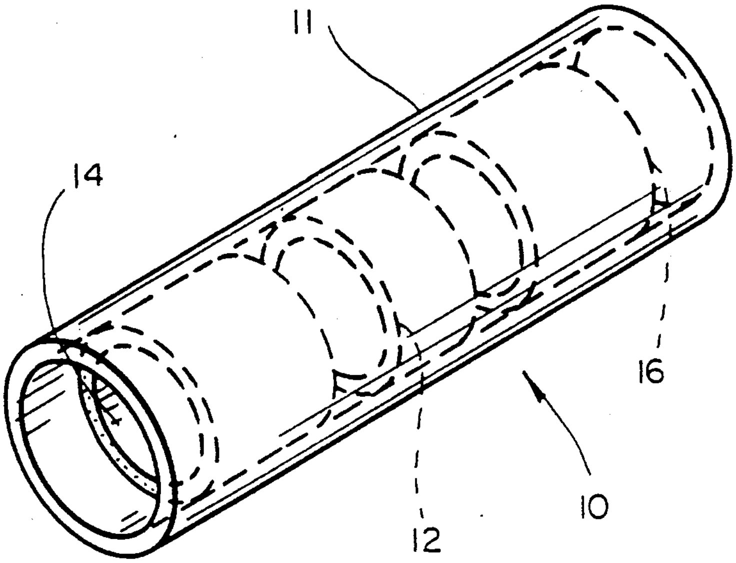
FIG. 1 illustrates a soldering device in which the adhesive composition of this invention is used.

A typical heat recoverable soldering device of this invention is shown in the accompanying drawing. In FIG. 1 of the drawing, a heat recoverable soldering device 10, comprises a heat recoverable sleeve 11 and is provided with solder insert 12 and adhesive inserts 14 and 16, each of the curable adhesive formulation of this invention. In FIG. 2, shielded cable 20 is insulated with uncrosslinked ethylene-tetrafluoroethylene copolymer (commercially available as Tefzel from du Pont). The insulation 22 has been removed to expose a portion of the metallic braid 24, which acts as the cable shield. Ground lead 26 is secured to the braid by solder 12 of the recovered soldering device 10. The adhesive inserts 14 and 16 seal the open ends of the recovered sleeve 11.

Although this is not necessary, it may be desirable to provide the device with a temperature indicator, for example a thermochromic material, in order to indicate when sufficient heat has been applied. Preferably this indicator is contained in a flux used with the solder insert. Examples of thermochromic indicators are given in U.S. Pat. No. 4,505,421, the disclosure of which is incorporated herein by reference.

If desired one or more conductors (or other bodies) may be pre-installed in the article, e.g. as described in U.S. Pat. No. 4,060,887 or U.S. Pat. No. 4,304,949, the disclosures of which are incorporated herein by reference, so that, in some cases, only a single conductor need be inserted in the device when the connection is made.

Suitable materials for the heat-recoverable article of the present invention include alkene homo- or copolymers, for example polyvinylidene fluoride, polyethylene, polyamides, polyesters or other thermoplastic materials capable of being rendered heat recoverable. Such materials may be cross-linked.

In order to form a solder connection between a plurality of bodies by means of the device according to the invention, the bodies are introduced into the appropriate position within the device and the device is heated to melt the solder insert, melt and cure the adhesive insert, and to recover the article about the bodies.

The events that should occur during installation of the device are complex, and it is a far from trivial problem to ensure that the correct events occur in the correct order. The device is intended to provide high reliability and electrical (or other) connection that must last for many years under unfavorable conditions. Such unfavorable conditions may include wet and corrosive environments and severe mechanical strain. The adhesive must provide an environmental seal and in general must provide strain relief under these exacting conditions.

The curable adhesive should melt and flow at the recovery temperature of the tubular article to fill the voids between the elongate bodies and the recovered article. At the same time, it should cure to inhibit flow of the adhesive into the solder connection or through the open end of the article. Generally as the adhesive flows to the open end or toward the thermally conductive solder, it is subjected to higher temperatures which causes rapid cure in these regions. Flow of the adhesive into the solder region is undesirable as it may interfere with the soldering process. Flow of the adhesive through the open end of the article may result in too little adhesive remaining in the article for optimum sealing and creates an unattractive final product. When used with a heat recoverable article of polyethylene or polyvinylidene fluoride the adhesive should melt at a temperature between about 80° and about 120° C., preferably between about 85° and about 100° C.

Generally, during the installation of the recoverable article, the adhesive melts and flows. As it cures, its viscosity should increase to at least about 1.5 times its initial molten viscosity. The viscosity of the adhesive is measured on a Rheometrics Mechanical Spectrometer at a frequency of 5 Radians per second at a temperature of 165° C. for a period of time such that the viscosity value remains stable.

A particularly preferred adhesive is that disclosed in U.S. patent application Ser. No. 07/288,311 (Guerra et al.) currently herewith, the entire disclosure of which is incorporated herein by reference. The adhesive preferably comprises:

(a) about 30 to about 80% by weight of a thermoplastic fluoropolymer;
(b) about 5 to about 40% by weight of an elastomeric fluoropolymer;
(c) about 5 to about 25% by weight of a thermoplastic ethylene copolymer comprising at least 50 mole % of units derived from ethylene and at least 5 mole % of units derived from at least one unsaturated comonomer containing at least one polar group;
(d) about 1 to about 10% by weight of a crosslinking agent component; and
(e) 0 to about 20% by weight of a tackifier;

all percentages by weight being based on the total weight of the five components (a) through (e).

Each of the thermoplastic fluoropolymer and the elastomeric fluoropolymer is preferably a polymer of one or more fluorinated monomers containing ethylenic unsaturation and optionally one or more other compounds containing ethylenic unsaturation. The fluorinated monomer may be a perfluorinated monoolefin, for example hexafluoropropylene or tetrafluoroethylene, or a partially fluorinated monoolefin which may contain other substituents, e.g. chlorine or perfluoroalkoxy, for example vinylidene fluoride, chlorotrifluoroethylene and perfluoroalkyl vinyl ethers in which the alkyl group contains up to six carbon atoms, e.g. perfluoro (methyl vinyl ether); the monoolefin is preferably a straight or branched chain compound having a terminal ethylenic double bond and containing less than six carbon atoms, especially two or three carbon atoms. The polymer preferably consists of units derived from fluorine-containing monomers. When units derived from other monomers are present, the amount thereof is preferably less than 30 mole %, generally less than 15 mole %; such other monomers include, for example olefins containing less than six carbon atoms and having a terminal ethylenic double bond, especially ethylene and propylene. The fluoropolymer is thermoplastic or elastomeric depending on the mole ratio of the monomer(s) used and the process used in its manufacture.

Preferred thermoplastic fluoropolymers are homo- and copolymers of vinylidene fluoride, such as copolymers thereof with hexafluoropropylene. Preferred thermoplastic fluoropolymers are commercially available from Pennwalt under the trademark Kynar, for example Kynar 7201 and Kynar 9301.

The thermoplastic fluoropolymer is present in the adhesive composition in an amount of about 30 to about 80% by weight. Preferably the thermoplastic fluoropolymer is present in an amount of about 35 to about 70% by weight and most preferably of about 40 to about 60% by weight, all percentages being by weight based on the total weight of the five components (a) through (e).

Preferred elastomers are copolymers of vinylidene fluoride and at least one other fluorinated monomer, especially one or more of hexafluoropropylene, tetrafluoroethylene and chlorotrifluoroethylene, the vinylidene fluoride content preferably being 30 to 70 mole %. Commercially available fluoroelastomers of this class include copolymers of vinylidene fluoride and hexafluoropropylene such as Viton A, Viton A35 and Viton AHV sold by du Pont; copolymers of vinylidene fluoride, hexafluoropropylene and tetrafluoroethylene such as Viton B and Viton B50 sold by du Pont; and copolymers of vinylidene fluoride and chlorotrifluoroethylene such as Kel-F sold by Minnesota Mining and Manufacturing Co. The Mooney viscosity of the elastomer at 100° C. is generally 20 to 200, preferably 30 to 160.

The elastomeric fluoropolymer is present in the adhesive composition in an amount of about 5 to about 40% by weight. Preferably the elastomer fluoropolymer is present in an amount of about 10 to about 30% by weight and most preferably of about 15 to about 25% by weight, all percentages being by weight based on the weight of the five components (a) through (e).

The ethylene copolymer is preferably a crystalline copolymer containing at least 50 mole %, preferably at least 60 mole %, especially at least 65 mole % of units derived from ethylene, and at least 5 mole %, preferably 10 to 40 mole %, especially 15 to 35 mole %, particularly 15 to 25 mole %, of units which contain at least one polar group which units may be obtained by copolymerizing at least one unsaturated comonomer containing at least one polar group and/or by modification, e.g. by partial or complete hydrolysis, of units derived from at least one such comonomer. The comonomer preferably contains a terminal ethylenic double bond. Preferred polar groups are carboxyl groups and carboxylic ester groups, including both pendant carboxylic ester groups, derived for example from alkyl esters of unsaturated carboxylic acid, and pendant alkyl carbonyloxy groups, derived for example from vinyl esters of saturated carboxylic acids. Other polar groups include cyano groups and hydroxyl groups, which may be obtained for example by hydrolysis of copolymer containing units derived from vinyl esters. Particularly suitable monomers include vinyl esters of saturated carboxylic acids containing 1 to 4 carbon atoms, especially vinyl acetate; acrylic and methacrylic acids; and alkyl (including cycloalkyl) and aryl esters, especially methyl esters, of acrylic and methacrylic acids, said esters preferably containing at most 10 carbon atoms, especially methyl methacrylate, methyl acrylate and ethyl acrylate.

The ethylene copolymer may contain units in addition to those derived from ethylene and those containing polar groups, but the amount of such additional units is preferably less than 20 mole %, particularly less than 10 mole %, especially substantially zero.

Particularly preferred as the copolymer is a copolymer of ethylene and vinyl acetate about 0 to 10 mole % of another comonomer, preferably a polar comonomer. Such copolymers are referred to herein as EVA copolymers. The vinyl acetate content in such copolymers is preferably 20 to 30 mole %. For some purposes an EVA copolymer having a melt index of not more than 10, e.g. 1.5 to 7.5, is preferred.

Suitable commercially available ethylene copolymers include the copolymers of ethylene and ethyl acrylate with a small proportion of methacrylic acid which are sold by Union Carbide as DPD 6169 and DPD 6181 and the 72:28 copolymers of ethylene and vinyl acetate which are sold by du Pont as Elvax 4260 and 260.

The thermoplastic ethylene copolymer is present in the adhesive composition in an amount of about 5 to about 25% by weight. Preferably the ethylene copolymer is present in an amount of about 10 to about 25% by weight and most preferably about 15 to about 20% by weight, all percentages being by weight based on the total weight of the five components (a) through (e).

The crosslinking component comprises a free radical generator, such as an organic peroxide crosslinking agent, of which many are known and commercially available, such as dicumyl peroxide, benzoyl peroxide, and the like. In addition to the free radical generator, a co-crosslinking agent may be present, if desired. The co-crosslinking agent can be a multifunctional monomer capable of crosslinking the particular polymer when initiated by the free radical generator or by irradiation. Typically, the co-crosslinking agent contains at least two ethylenic double bonds, which may be present, for example, in allyl, methallyl, propargyl or vinyl groups. Preferred co-crosslinking agents are triallyl cyanurate (TAC), triallyl isocyanurate (TAIC), triallyl trimellitate, triallyl trimesate, tetrallyl pyromellitate, the diallyl ester of 1,1,3-trimethyl-5-carboxy-3-(p-carboxypenyl) indan or other multifunctional monomer such as N,N'-m-phenylene dimaleimide, or the like. Mixtures of co-crosslinking agents can be used.

The crosslinking component, i.e. the free radical generator and co-crosslinking agent, if present, is present in an amount of about 1 to about 10%, preferably of about 2 to about 8% and most preferably of about 3 to about 6%, all percentages being by weight based on the total weight of the five components.

The term "tackifier" is used in adhesive art to denote a material which when added to an adhesive composition promotes its adhesion to a substrate, by increasing its ability to wet the substrate. Many tackifiers are known. We prefer to use low molecular weight polymers of monomers which contain ethylenic unsaturation and are free of polar groups, for example polymers of one or more compounds of the formula $$R_1CH=CR_2R_3$$

wherein each $R_1$, $R_2$ and $R_3$, which may be the same or different, is a substituted or unsubstituted alkyl (including cycloalkyl), alkenyl (including cycloalkenyl), aryl, aralkyl or alkaryl radical containing less than ten carbon atoms. Suitable such tackifiers include Nevpene 9500, which is believed to be a copolymer of a mixture of aromatically and alphatically substituted ethylenes, and Piccotex 75, which is believed to be a copolymer of vinyl toluene and α-methylstyrene. Other tackifiers which can be used include terpene-phenolic resins (e.g. Nevillac Hard). The tackifiers used preferably have at least one of the following properties

| | |
|---|---|
| Brookfield Viscosity at 160° C. | 80–1500 centipoises |
| Ball-and-Ring Softening point | 50–130° C. |
| Molecular Weight | <3000 |

The tackifier is optional in the adhesive composition and if present should be in an amount of less than about 20% by weight. Preferably the composition contains about 5 to about 20% by weight of tackifier and most preferably about 10 to about 15% by weight, all percentages being by weight based on the total weight of the five components (a) through (e).

The adhesive may contain additional additives such as stabilizers, flame retardants, pigments, fillers and the like. Generally, additives are present in a total amount of less than about 10% by weight based on the weight of the total composition (i.e. the total weight of components (a) through (e) plus additives).

The following examples illustrate a heat recoverable soldering device in accordance with this invention.

EXAMPLES 1–7

Adhesive formulations having the ingredients and amounts thereof specified in Table I were prepared by mixing the ingredients in a Brabender at 60 rpm for approximately 10 minutes at 110° C.

TABLE I

| | 1 | 2 | 3 | 4 | 5 | 6 | 7 |
|---|---|---|---|---|---|---|---|
| PVDF | 57% | 55% | 53% | 55% | 53% | 55% | 53% |
| Ethylene Copolymer | 12.5% | 12.5% | 12.5% | 12.5% | 12.5% | 12.5% | 12.5% |
| Fluoroelastomer | 10% | 10% | 10% | 10% | 10% | 10% | 10% |
| Tackifier #1 | 5% | 5% | 5% | 5% | 5% | 5% | 5% |
| Tackifier #2 | 10% | 10% | 10% | 10% | 10% | 10% | 10% |
| Xlinking Agent | 3% | 3% | 3% | 3% | 3% | 5% | 7% |
| Co-Xlinking Agent #1 | — | 2% | 4% | — | 4% | — | — |
| Co-Xlinking Agent #2 | — | — | — | 2% | — | — | — |
| Misc. Additives | 2.5% | 2.5% | 2.5% | 2.5% | 2.5% | 2.5% | 2.5% |

PVDF = A thermoplastic terpolymer of vinylidene fluoride, tetrafluoroethylene and hexafluoropropylene, commercially available as Kynar 9301 from Pennwalt.
Ethylene Copolymer = a copolymer of ethylene and vinyl acetate containing 28% vinyl acetate, commercially available as Elvax 4260, commercially available from du Pont.
Fluoroelastomer = a copolymer of vinylidene fluoride and hexafluoropropylene (Molar ratio 60:40) commercially available as Viton A 35 from du Pont.
Tackifier #1 = a copolymer of vinyltoluene and -methyl styrene having a softening point of 75° C., commercially available as Piccotex 75 from Hercules.
Tackifier #2 = a copolymer of vinyltoluene and α-methyl styrene having a softening point of 120° C., commercially available as Piccotex 120 from Hercules.
Crosslinking Agent = 2,5-dimethyl-2,5-di-(t-butylperoxy) hexyne-3, commercially available as Luperco 130XL from Pennwalt.
Co-crosslinking Agent #1 = N,N'-m-phenylenedimaleimide, commercially available from Pennwalt.
Co-crosslinking Agent #2 = triallylisocyanurate.

The adhesive formulations of Example 2 was incorporated into a heat-recoverable soldering device as in FIG. 1 and installed as in FIG. 2, described above. Twenty-five samples were prepared and installed.

The installed devices were tested as follows:

Moisture Resistance Test: The samples were tested using MIL-S-83519 which is a 10 day temperature cycling (−10° to 65° C.) test conducted at 95% humidity.

Insulation Resistance Test: The samples were tested using MIL-S-83519. Within one hour from the time they were removed from the humidity test, the samples were immersed in a salt and water-wetting agent solution for 30 minutes. While the samples were still immersed, a voltage of 500 volts DC was applied between the ground lead and the water bath. An ohmmeter is used to measure the resistance of the sealing sleeve. If the measured resistance is 1000 megaohm or greater the sample passed the test. All samples passed. The test was then extended beyond the method of MIL-S-83519 and the voltage was increased to 1000 volts DC. The resistance was again measured. All examples passed.

Observation: The installed devices were visually examined. In all instances, the adhesive exhibits minimal flow out of the open ends of the device and/or into the solder connection region.

What is claimed is:

1. A heat-recoverable soldering device comprises:

(a) a hollow heat-recoverable tubular article having an open end and containing a solder insert for forming a solder connection between a plurality of elongate bodies inserted through said open end; and (b) a curable, polymer adhesive insert positioned between said solder insert and said open end, said adhesive comprising (1) about 30 to about 80% by weight of a thermoplastic fluoropolymer;

(2) about 5 to about 40% by weight of an elastomeric fluoropolymer;

(3) about 5 to about 25% by weight of a thermoplastic ethylene copolymer comprising at least 50 mole % of units derived from ethylene and at least 5 mole % of units derived from at least one unsaturated comonomer containing at least one polar group;

(4) about 1 to about 10% by weight of a crosslinking agent component; and (5) 0 to about 20% by weight of a tackifier; all percentages by weight being based on the total weight of the five components (1) through (5);

wherein during heat recovery of said article, said solder melts and forms said connection, and said adhesive melts and flows to fill any voids between said elongate bodies and the recovered article, and cures such that flow of the adhesive into the solder connection or through the open end of the articles is inhibited; said cured adhesive environmentally sealing said open end when the article has recovered.

2. A heat-recoverable soldering device in accordance with claim 1, wherein the adhesive melts and increases in viscosity by at least about 1.5 times during installation of the device.

* * * * *

UNITED STATES PATENT AND TRADEMARK OFFICE

CERTIFICATE OF CORRECTION

PATENT NO. : 5,052,610

DATED : Guerra, et al

INVENTOR(S) : October 1, 1991

It is certified that error appears in the above-indentified patent and that said Letters Patent is hereby corrected as shown below:

Column 1, line 25, after "most" insert --common--.

Column 3, line 7, replace "used" by --use--.

Column 3, line 21, after "96%" insert --Sn--.

Column 5, lines 5 to 6, after "(Guerra et al.)" replace "currently" by --filed concurrently--.

Column 6, line 12, replace "elastomer" by --elastomeric--.

Column 6, line 36, replace "copolymer" by --copolymers--.

Signed and Sealed this

Twenty-first Day of June, 1994

Attest:

BRUCE LEHMAN

Attesting Officer

Commissioner of Patents and Trademarks